United States Patent [19]

Smith

[11] Patent Number: 5,032,463

[45] Date of Patent: Jul. 16, 1991

[54] VERY LOW DENSITY POLYETHYLENE FILM FROM BLENDS

[75] Inventor: Edwin R. Smith, Chicago, Ill.

[73] Assignee: Viskase Corporation, Chicago, Ill.

[21] Appl. No.: 364,034

[22] Filed: Jun. 7, 1989

Related U.S. Application Data

[63] Continuation-in-part of Ser. No. 220,133, Jul. 18, 1988, abandoned.

[51] Int. Cl.$^5$ .............................................. B32B 27/08
[52] U.S. Cl. ................................. 428/520; 428/34.9; 428/36.7; 428/349; 428/516; 428/518; 428/910; 525/240
[58] Field of Search ............. 428/516, 910, 518, 34.9, 428/520, 36.7, 349; 525/240

[56] References Cited

U.S. PATENT DOCUMENTS

| | | | |
|---|---|---|---|
| 3,365,520 | 2/1968 | Foster et al. | 260/897 |
| 3,456,044 | 10/1969 | Pahlke | 264/25 |
| 3,555,604 | 1/1971 | Pahlke | 18/14 |
| 3,900,635 | 9/1975 | Funderburk, Jr. et al. | 428/213 |
| 4,424,243 | 1/1984 | Nishimoto et al. | 428/36 |
| 4,429,079 | 1/1984 | Shibata et al. | 525/240 |
| 4,438,238 | 3/1984 | Fukushima et al. | 525/240 |
| 4,547,413 | 10/1985 | Lustig et al. | 428/35 |
| 4,623,581 | 11/1986 | Hert | 428/220 |
| 4,640,856 | 2/1987 | Ferguson et al. | 428/36 |
| 4,671,987 | 6/1987 | Knott, II et al. | 428/216 |
| 4,720,427 | 1/1988 | Clauson et al. | 428/349 |
| 4,726,997 | 2/1988 | Mueller et al. | 428/480 |
| 4,734,327 | 3/1988 | Vicik | 428/332 |
| 4,748,206 | 5/1988 | Nogiwa et al. | 525/88 |
| 4,762,882 | 8/1988 | Okano et al. | 525/74 |
| 4,770,912 | 9/1988 | Furrer et al. | 428/35 |
| 4,793,956 | 12/1988 | Nogiwa et al. | 264/41 |
| 4,801,652 | 1/1989 | Mizutani et al. | 525/240 |
| 4,804,714 | 2/1989 | Olivo | 525/240 |
| 4,837,084 | 6/1989 | Warren | 428/349 |
| 4,842,922 | 6/1989 | Krupp et al. | 428/198 |
| 4,863,769 | 9/1989 | Lustig et al. | 428/34.9 |

FOREIGN PATENT DOCUMENTS

| | | |
|---|---|---|
| 102854 | 3/1984 | European Pat. Off. . |
| 0120503 | 3/1984 | European Pat. Off. . |
| 172650 | 4/1986 | European Pat. Off. . |
| 168928 | 12/1986 | European Pat. Off. . |
| 0236099 | 2/1987 | European Pat. Off. . |
| 0217252 | 9/1987 | European Pat. Off. . |
| 0260038 | 4/1988 | European Pat. Off. . |
| 2097324 | 4/1982 | United Kingdom . |
| 2154178 | 1/1985 | United Kingdom . |

OTHER PUBLICATIONS

"New Kind of Polyethylene Combines Flexibility, Toughness, Heat Resistance", *Plastics Technology*, pp. 13, 15 (Oct., 1984).

Utracki et al., "Linear Low Density Polyethylene and Their Blends: Part 4 Shear Flow of LLDPE and LDPE", *Polymer Engineering and Science*, vol. 27, No. 20, pp. 1512–1522 (Mid-Nov., 1987).

Kurtz, S. J. "VLDPE: A Break-Through in Flexible Linear Polyethylene", *Antec' 85, Conference Proceedings for the Society of Plastics Engineers, Inc. 43rd Annual Technical Conference*, pp. 463–466 (Apr. 29–May 2, 1985).

*Primary Examiner*—Edith L. Buffalow
*Attorney, Agent, or Firm*—Cedric M. Richeson

[57] ABSTRACT

Biaxially stretched monolayer and mutilayer films comprising blends of a 1-butene very low density polyethylene with a 1-hexene very low density polyethylene have improved combinations of properties including good puncture resistance and shrinkage values and unexpectedly good machine direction shrink force.

20 Claims, No Drawings

VERY LOW DENSITY POLYETHYLENE FILM FROM BLENDS

BACKGROUND OF THE INVENTION

This application is a continuation-in-part of application Ser. No. 220,133, filed July 18, 1988 now abandoned.

The present invention relates to packaging films. In particular, the present invention relates to biaxially stretched films made of copolymers of polyethylene.

Polyethylene is the name for a polymer whose basic structure is characterized by the chain $(CH_2CH_2)_n$. Polyethylene homopolymer is generally described as being a solid which has a partially amorphous phase and partially crystalline phase with a density of between 0.915 to 0.970 $g/cm^3$. The relative crystallinity of polyethylene is known to affect its physical properties. The amorphous phase imparts flexibility and high impact strength while the crystalline phase imparts a high softening temperature and rigidity.

Unsubstituted polyethylene is generally referred to as high density homopolymer and has a crystallinity of 70 to 90 percent with a density between about 0.96 to 0.97 $g/cm^3$. Most commercially utilized polyethylenes are not unsubstituted homopolymer but instead have $C_2-C_8$ alkyl groups attached to the basic chain. These substituted polyethylenes are also known as branched chain polyethylenes. Also, commercially available polyethylenes frequently include other substituent groups produced by copolymerization. Branching with alkyl groups generally reduces crystallinity, density and melting point. The density of polyethylene is recognized as being closely connected to the crystallinity. The physical properties of commercially available polyethylenes are also affected by average molecular weight and molecular weight distribution, branching length and type of substituents.

People skilled in the art generally refer to several broad categories of polymers and copolymers as "polyethylene". Placement of a particular polymer into one of these categories of "polyethylene" is frequently based upon the density of the "polyethylene" and often by additional reference to the process by which it was made since the process often determines the degree of branching, crystallinity and density. In general, the nomenclature used is nonspecific to a compound but refers instead to a range of compositions. This range often includes both homopolymers and copolymers.

For example, "high density" polyethylene (HDPE) is ordinarily used in the art to refer to both (a) homopolymers of densities between about 0.960 to 0.970 $g/cm^3$ and (b) copolymers of ethylene and an alpha-olefin (usually 1-butene or 1-hexene) which have densities between 0.940 and 0.958 $g/cm^3$. HDPE includes polymers made with Ziegler or Phillips type catalysts and is also said to include high molecular weight "polyethylenes". In contrast to HDPE, whose polymer chain has some branching, are "ultrahigh molecular weight polyethylenes" which are essentially unbranched specialty polymers having a much higher molecular weight than the high molecular weight HDPE.

Hereinafter, the term "polyethylene" will be used (unless indicated otherwise) to refer to ethylene homopolymers as well as copolymers of ethylene with alpha-olefins and the term will be used without regard to the presence or absence of substituent branch groups.

Another broad grouping of polyethylene is "high pressure, low density polyethylene" (LDPE). The polyethylene industry began in the 1930's as a result of the discovery of a commercial process for producing LDPE by Imperial Chemical Industries, Ltd. researchers. LDPE is used to denominate branched homopolymers having densities between 0.915 and 0.930 $g/cm^3$ as well as copolymers containing polar groups resulting from copolymerization e.g. with vinyl acetate or ethyl acrylate. LDPEs typically contain long branches off the main chain (often termed "backbone") with alkyl substituents of 2 to 8 carbon atoms.

In the 1970's a new grouping of polyethylene was commercialized—Linear Low Density Polyethylene (LLDPE). Only copolymers of ethylene with alpha-olefins are in this group, LLDPEs are presently recognized by those skilled in the art as having densities from 0.915 to 0.940 $g/cm^3$ The alpha-olefin utilized is usually 1-butene, 1-hexene, or 1-octene and Ziegler-type catalysts are usually employed (although Phillips catalysts are also used to produce LLDPE having densities at the higher end of the range).

In the 1980's yet another grouping of polyethylene has come into prominence—Very Low Density Polyethylene (VLDPE) which is also called "ultra low density polyethylene" (ULDPE). This grouping like LLDPEs comprise only copolymers of ethylene with alpha-olefins, usually 1-butene, 1-hexene or 1-octene. However, VLDPEs have lower densities than LLDPEs. The densities of VLDPEs are recognized by those skilled in the art to range between 0.860 and 0.915 $g/cm^3$. A process for making VLDPEs is described in European Patent Document publication number 120,503 whose text and drawing are hereby incorporated by reference into the present document.

Various types of polyethylene resins have long been used to produce films having different properties. These polyethylenes have been used alone, in blends and with copolymers in both monolayer and multilayer films for packaging applications for such food products as poultry, fresh red meat and processed meat. In the food industry greater use of centralized processing of foods in conjunction with increased handling and long distance transportation have increased the demand for packaging films having superior properties.

It is generally known that selection of films for packaging food products include consideration of one or more criteria such as puncture resistance, shrinkability, shrink force, cost, sealability, stiffness, strength, printability, durability, barrier properties, machinability, optical properties such as haze and gloss, flex-crack resistance and government approval for contact with food.

For example, several film materials containing polyethylene have been either used or proposed for packaging frozen poultry. In general, commercial poultry packaging operations require bags made from materials able to withstand the following typical process and transfer 1. Inserting a bird into a bag fabricated from a shrinkable film;
2. Evacuating the bag;
3. Clamping or otherwise sealing the neck of the bag;
4. Transporting the bird (e.g. by a conveyor belt) to a shrink tunnel;
5. Shrinking the bag tightly around the bird by exposing the bag to a temperature of about 90-95° C. for up to about six to eight seconds;

6. Quick freezing and storage of the packaged bird at temperatures as low as −40° C.; and
7. Transporting the packaged bird from the commercial packer to the ultimate user.

A film useful for frozen poultry packaging will include among its desirable properties the following:

a) A shrinkage value that yields a reduction in the area of the film at a temperature from 90-95° C. that is sufficient to conform the film to the irregular shape of the bird;

b) a shrink force at a temperature of 90-95° C. is required that is sufficient to pull the wings of the bird in tightly toward the body with sufficient residual shrink force to maintain a tight wrap around the bird; and c) a puncture resistance sufficient to withstand the packaging operation itself as well as subsequent transport of the packaged bird.

All the above properties should be provided in a film at a minimum of cost.

Several polyolefin films have previously been proposed for use as poultry bags.

U.S. Pat. No. 3,555,604 (Pahlke) discloses that low density polyethylene may be biaxially oriented to produce a film which is useful for packaging food stuffs such as turkey.

U.S. Pat. No. 3,365,520 (Foster et al) discloses a bioriented film of a blend of an ionomer and an ethylene homopolymer or copolymer.

Multilayer bioriented films have also been proposed such as those disclosed in U.S. Pat. No. 3,900,635 (Funderburk, Jr. et al) having a first layer of ethylene homopolymer or copolymer and a second layer of a blend of an ionomer and an ethylene homopolymer or copolymer. The multilayer film of Funderburk, Jr. et al is said to have a shrinkage of at least 25% in the transverse direction at 90-95° C.

Yet another biaxially oriented film for poultry bags is described in U.S. Pat. No. 4,547,413 (Lustig et al) wherein a mixture of ethylene-vinyl acetate copolymer and either low pressure high density polyethylene or low pressure low density polyethylene is suggested.

Also, various blends of different polyethylene resins have been reported. For example, blends of LLDPE with LLDPE or LDPE have been reported in the article by Utracki et al, "Linear Low Density Polyethylene and Their Blends: Part 4 Shear Flow of LLDPE Blends with LLDPE and LDPE", *Polymer Engineering and Science.* Vol. 27, No. 20, pp 1512-1522 (mid-November, 1987). In its introduction, the above article states that ... "at least 60% of LLDPE is sold in blends with polyolefins or EVA (ethylene-vinyl acetate copolymers) (cite omitted). Amelioration of properties (e.g., puncture resistance), lowering of material cost or improvement of processability are the main reasons". The article goes on to discuss data relating to blends of a LLDPE made from a copolymer of polyethylene with 1-butene with (a) a LLDPE made from a copolymer of polyethylene and 1-hexene, and (b) a LDPE.

VLDPE has been suggested for use as a blending resin with HDPE, polypropylene, ethylene-vinyl acetate copolymer and ethylene-propylene copolymer (see e.g. *Plastics Technology.* p.13 October, 1984). Also, European Patent Document 236,099 discloses a shrinkable multilayer film having outer layers which can comprise a blend of LLDPE and VLDPE.

U.S. Pat. No. 4,640,856 (Ferguson et al) discloses heat shrinkable multilayer films containing VLDPE which are useful in packaging meat, poultry and dairy products. Ferguson, et al in describing their thermoplastic polymeric layer also states that "in certain applications blends of VLDPE, LLDPE and/or EVA may be used to achieve desired properties".

U.S. Pat. No. 4,671,987 (Knott, II et al) discloses a printable composite stretch wrap multilayer film which may comprise a layer of VLDPE. Knott, II et al state that "The VLDPE can be blended with from 0 to about 50 wt.% of another ethylene polymer such as polyethylene homopolymer, ethylene- vinyl acetate copolymer, linear low density polyethylene, and mixtures of these compounds".

U.S. Pat. No. 4,720,427 (Clausen et al) discloses an oriented multi-layer heat sealable film, Clausen et al state that this film may contain a layer comprising a blend of VLDPE with a "polyolefin". Blends of VLDPE with polypropylene are particularly discussed.

U.S. Pat. No. 4,726,997 (Mueller et al) discusses blends of VLDPE with modified ethylene propylene copolymer and/or sodium carbonate.

None of the foregoing patents have disclosed specific blends of very low density polyethylenes having surprisingly good physical properties. Also, presently known films used as poultry bags continue to suffer from insufficient puncture resistance, shrinkability and/or shrink force.

Punctured and leaking bags are still very much a problem in poultry packaging. Films made of 1-butene very low density polyethylene alone have undesirably low hot water puncture resistance, but 1-butene VLDPE does have good shrinkability. Films made of 1-hexene VLDPE have excellent hot water puncture properties but poor shrinkability. Furthermore, the shrink force of both films in the machine direction is undesirably low at both elevated temperature and residually at room temperature. Also, it would be highly desirable for poultry bags to have improved dynamic puncture resistance with good shrinkability.

Summary of the Invention

According to the present invention a blend of a first component comprising a copolymer of ethylene and 1-butene having a density less than 0.915 g/cm$^3$, and a second component comprising a copolymer of ethylene and 1-hexene having a density less than 0.915 g/cm$^3$ is provided. This blend may be formed into a uniaxially or biaxially stretched film having shrink properties. Surprisingly, certain properties of the biaxially stretched film of the blend are superior to films produced by either component of the blend alone. In particular, blends of a copolymer of ethylene and 1-butene having a density of less than 0.915 g/cm$^3$ with a copolymer of ethylene and 1-hexene having a density less than 0.915 g/cm$^3$ have produced shrinkable biaxially stretched flexible films having unexpectedly good puncture resistance and/or shrink force. In food packaging applications, a blend of the hexene copolymer with the butene copolymer in a 3:1 ratio provides a shrinkable film with excellent puncture resistant properties which may be equal or superior to films made of either copolymer alone. Advantageously, multilayer films incorporating blends in at least one layer according to the present invention may be made having superior puncture resistance at low cost.

DETAILED DESCRIPTION OF THE INVENTION

Very Low Density Polyethylenes (VLDPEs) are copolymers of ethylene and an alpha-olefin (such as 1-butene, 1-hexene or 1-octene) which have densities between 0.915 and 0.860 g/cm$^3$ VLDPEs may be made by solution processes or fluidized bed processes. European Patent Application 84 103441.6 having publication number 120503 (which is hereby incorporated by reference in its entirety into the present application) describes a suitable method for preparation of low density, low modulus ethylene copolymers utilizing a fluidized bed. These ethylene copolymers are described as having a density of less than 0.915 g/cm$^3$ and a 1% secant modulus of less than 140,000 kPa and are believed to be suitable for the blends and films of the present invention. VLDPEs of various densities are also commercially available from Dow Chemical Company of Midland, Mich., U.S.A. and Union Carbide Corporation of Danbury, Conn., U.S.A.

Suitable copolymers of ethylene with 1-butene include those having a density of about 0.905 g/cm$^3$ as measured by ASTM Standard Test Method D 1505 and a melt index of 1.0 as measured by ASTM Test Method 1238. Suitable copolymers of ethylene with 1-hexene include those having a density of 0.910 g/cm$^3$ and a melt index of 1.0. Advantageously, the melt index (as measured by ASTM D-1238, Condition E) of each above copolymer will be less than 2.0 dg/min with a melt index of 0.1 to 1.0 dg/min preferred. Also, the density of each VLDPE copolymer is preferably at least 0.901.

A preferred copolymer of ethylene with 1-butene is commercially available from Union Carbide Corporation under the brand name designation UCAR FLX Resin DFDA-1137 Natural 7. This resin has a reported density of 0.905 g/cm$^3$, a melt index of 1.0 and is further described in a four page product brochure PP 72-36B whose contents are hereby incorporated by reference.

A preferred copolymer of ethylene with 1-hexene is available from Union Carbide Corporation under their experimental trade designation DEFD 1064.

Beneficially, the VLDPE copolymer resins of the present invention will be copolymerized by adding either 1-butene monomer or 1-hexene monomer to an ethylene monomer under polymerization conditions such that the resultant very low density polyethylene resin having a density less than 0.915 g/cm$_3$ will comprise at least 75 weight percent of its polymer units derived from ethylene and preferably at least 85 weight percent polymer units derived from ethylene. For 1-hexene based VLDPE it is especially preferred that at least 90 weight percent of its polymer units be derived from ethylene. As the amount of the ethylene monomer component decreases, there is a tendency towards less crystalline materials which are increasingly elastomeric. Materials which are exceedingly elastomeric present one or more problems for food package applications such as difficulty in controlling orientation to a set T.D. width. These elastomeric materials typically are too soft to handle easily; have weak puncture strength at elevated temperatures or in hot water; and/or have excessive n-hexane extractables (which are undesirable in food packaging). VLDPE copolymers utilized by the present invention will preferably have at least one percent by weight of polymer units derived from the alpha-olefin component of the VLDPE.

Films of the present invention are made from blends of a 1-butene VLDPE with a 1-hexene VLDPE. The suitable ethylene-alpha-olefin blend components used in the present invention may also be further distinguished from undesirably rubber-like or elastomeric materials by melting point, Vicat softening point, and/or 1% secant modulus. Many elastomers or synthetic rubbers lack a crystalline melting point. VLDPE resins utilized in the present invention have a crystalline melting point which may be determined by differential scanning calorimetry (DSC) according to a method similar to ASTM D-3418 using a 5° C. per minute heating rate and a DuPont 9000 brand differential scanning calorimeter. Suitable resins may be differentiated from undesirably elastomeric materials by measurement of the crystalline melting point. The melting point of suitable resins is beneficially greater than 100° C. and preferably greater than about 110° C. Resins having a melting point greater than about 125° C. are disadvantageously and decreasingly (with higher temperatures) difficult to process into biaxially stretched food packaging films. VLDPE resins useful in forming the blend of the present invention for food packaging have a melting point which is preferably between 115° and 125° C.

The Vicat softening point may also be used to further define the present invention. Films of the present invention utilize VLDPE resins which generally have a Vicat softening point greater than about 60° and preferably greater than 75° C. A Vicat softening point between about 75° and 100° C. is preferred. Materials having lower Vicat softening points are elastomeric rubber-like compositions which are disadvantageously difficult to dimensionally control during biaxial stretching.

Suitable films according to the invention will contain a blend of, as essential components, (i) a copolymer of ethylene with 1-butene and (ii) a copolymer of ethylene with 1-hexene. Suitable VLDPE containing films according to the present invention will beneficially have a 1% secant modulus as measured by ASTM D-882 of at least about 10,000 p.s.i. (69 MPa). Films with lower values tend to be too soft for proper handling as food packaging films for use in e.g. poultry bags. Advantageously, food packaging films of the present invention will have a 1% secant modulus between about 10,000 to 40,000 p.s.i. (69–280 MPa); this range of softness provides a desirable degree of softness for ease of handling during both film manufacturing and food packaging operations.

Also, the film blend may contain other components including additional polymers, copolymers, processing aids, catalyst residues and/or property enhancing additives. The 1-butene VLDPE, 1-hexene VLDPE blend may, for example, be further blended with one or more additional polymers or copolymers such as other VLDPEs, LDPE, HDPE, LLDPE, polypropylene, polyester, nylon, PVDC, Ethylene- vinylacetate copolymer (EVA) and ionomers.

Beneficially, blends having a weight ratio of 1-butene VLDPE (A) to 1-hexene VLDPE (B) between about 1:7 to 3:1 are employed. As demonstrated by the examples below, biaxially oriented films made from blends within this range may show unexpected properties (such as higher than expected machine direction shrink force) and advantageous combinations of both expected and unexpected properties. Advantageously, an A:B weight ratio between about 1:4 to 3:1 may be used. A 1:4 to 1:2 ratio is preferred and a 1:3 ratio is especially preferred. Within these ratios, biaxially oriented films of the present invention have properties and combinations of properties such as shrink percentage, shrink force, and hot water puncture time which range from good to excellent as demonstrated by the examples below. In particular, the dynamic puncture resistance for a 1:3 ratio of DFDA 1137 1-butene VLDPE to DEFD 1569 1-hexene VLDPE is unexpectedly superior to the unblended films of each resin. It is contemplated that all blends of 1-butene VLDPE (A) with 1-hexene VLDPE (B) will be useful. Moreover, it is further believed, as demonstrated by the examples, that blends comprising from about 20 to 75 weight percent of component A with from about 25–80 weight percent component B are particularly suitable, with 25 weight percent of A and 75 weight percent of B forming an especially advantageous blend.

Advantageously, a preferred embodiment of the inventive heat shrinkable film will have a maximum extractable portion of 5.5 percent by weight of polymer in n-hexane at 50° C. for 2 hours as further described below. This 5.5 weight percent represents the desired maximum n-hexane extractactable limit for olefin copolymers of the type employed by the present invention for use in articles that contact food except for articles used for packing or holding food during cooking. Beneficially, the maximum extractable portion as described above will be 2.6 percent in an especially preferred embodiment of the inventive film suitable for use in articles used in packing or holding food during cooking. The above maximum extractable values correspond to current limits for a class of resins intended for use in contact with food as set forth and described by the U.S. Food & Drug Administration in 21 CFR 177.1520 (which description is hereby incorporated in its entirety by reference).

Unless otherwise noted, the resins utilized in the present invention are generally commercially available in pellet form and, as generally recognized in the art, may be melt blended or mechanically mixed by well known methods using commercially available equipment including tumblers, mixers or blenders. The resin blend of 1-butene VLDPE and 1-hexene VLDPE may have other additional resins blended therewith in any amount. Also, if desired, well known additives such as processing aids, slip agents, antiblocking agents, pigments, etc., and mixtures thereof may be incorporated into the film, by blending prior to extrusion. The resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. In extrusion of the VLDPE blends of the present invention, barrel and die temperatures, for example, may range between about 170° and 180° C. However, depending upon such factors as other resins which may be employed (e.g. in a multilayer film), the manufacturing process used and particular equipment and other process parameters utilized, variations are expected. Actual process parameters including process temperatures will be set by one skilled in the art without undue experimentation.

In a preferred extrusion double bubble process of the type described in U.S. Pat. No. 3,456,044 the primary tube leaving the die is inflated by admission of air, cooled, collapsed, and then preferably oriented by reinflating to form a secondary bubble with reheating to the film's orientation (draw) temperature range. For the present invention, the orientation temperature is generally above the Vicat Softening point and below the melting point of each VLDPE blend component. Machine direction (M.D.) orientation is produced by pulling or drawing the film tube e.g. by utilizing two pairs of rollers travelling at different speeds, and transverse direction (T.D.) orientation is obtained by radial bubble expansion. The stretch oriented film is set by rapid cooling. Suitable machine direction and transverse direction stretch ratios are from about 2:1 to about 5:1 with M.D./T.D. ratios of about 5:1/2.5:1 preferred.

Suitable thermoplastic films of the present invention exhibit one or more of the following properties:
 (i) A dynamic puncture resistance greater than or equal to that for the unblended films alone.
 (ii) A hot water puncture value of at least 20 seconds.
 (iii) A shrinkage value of at least about 15 percent (preferably at least 20 percent) in the machine direction and at least about 20 percent (preferably at least 25 percent) in the transverse direction.
 (iv) A shrink force value in the machine direction that is greater than the M.D. shrink force value for either of the two essential blend components alone.

Dynamic Puncture Resistance

The dynamic puncture resistance procedure is used to compare films for their resistance to bone puncture. It measures the energy required to puncture a test sample with a sharp pyramidal metal point made to simulate a sharp bone end. A Dynamic Ball Burst Tester, Model No. 13-8, available from Testing Machines, Inc., Amityville, Long Island, N.Y., is used, and a modified tip is installed on the tester probe arm for use in this test procedure. The modified tip is constructed from a ⅜ inch diameter conical tip having a configuration of a right circular cone with the angle between the cone axis and an element of the conical surface at the vertex being about 65°. Three equally spaced and abutting planar surfaces are machined to a smooth finish on the cone surface to form a pyramidal shaped point. At least six test specimens approximately 4 inches square are prepared, a sample is placed in the sample holder, and the pendulum is released The puncture energy reading is recorded. The test is repeated until at least 6 samples have been evaluated. The results are calculated in cm-kg per mil of film thickness and are averaged.

Hot Water Puncture

Hot water puncture values are obtained by performing a hot water puncture test as follows. Water is heated to 98 ±1° C. A ⅜ inch (0.95 cm) round wooden dowel is sharpened on one end to a conical point. This sharpened point has the configuration of a right circular cone, and the angle between the cone axis and an element of the conical surface at the vertex is about 60°. This cone is then rounded. The wooden dowel is fastened to a seven inch (17.8 cm) long wooden block so that the rounded point wooden block. A sPecimen about 3 inches wide (7.6 cm) in the machine direction (MD) and about eighteen inches (45.7 cm) long is cut from the test sample material. One end of the specimen is placed on the end of the wooden block opposite the pointed dowel. The specimen is wrapped around the end of the sharpened dowel and back to the wooden block on the opposite side, where it is secured. The film thickness in the area of contact with the sharpened dowel is measured in order to assure that the film specimen thickness is truly representative of the given test sample material. The specimen and pointed dowel are quickly immersed five inches (12.7 cm) into the hot water and a timer is started. The timer is stopped when the wooden dowel point punctures the film specimen. The test Procedure is repeated five more times with new 3 inch (7.6 cm) wide MD specimens from the given test sample material. The time required for penetration is recorded and then averaged for the six MD specimens.

Resistance to puncture times of below 6-7 seconds are generally considered unacceptable, while times of 20 seconds or more are good, 60 seconds or more are very good and 120 seconds or more are excellent.

For multilayer films, the above procedure is followed except a similarly shaped stainless steel metal probe having an angle of 37° is substituted for the wood dowel and the water is heated to 95 +/−1° C.

The multilayer hot water puncture test has been found to be more severe than the monolayer test and resistance to puncture of six seconds or more is considered to be exceptionally good.

Shrinkage

The biaxially stretched films of the present invention are heat shrinkable. Biaxially stretched films are "heat shrinkable" as that term is used herein, if the film has an unrestrained shrinkage of at least 5 percent in two directions at 90° C.

Shrinkage values are obtained by measuring unrestrained shrink of the stretched film at 90° C for five seconds. Four test specimens are cut from a given sample of the oriented film to be tested. The specimens are cut to 10 cm. in the machine direction by 10 cm. in the transverse direction. Each specimen is completely immersed for 5 seconds in a 90° C. water bath. The distance between the ends of the shrunken specimen is measured. The difference in the measured distance for the shrunken specimen and the original 10 cm. is multiplied by ten to obtain the percent of shrinkage for the specimen. The shrinkage for the four specimens is averaged for the MD shrinkage values of the given film sample, and the shrinkage for the four specimens is averaged for the TD shrinkage value.

Shrink Force

The shrink force of a film is that force or stress required to prevent shrinkage of the film and was determined from film samples taken from each film. Four film samples were cut 1" (2.54 cm) wide by 7" (17.8 cm) long in the machine direction and 1" (2.54 cm) wide by 7" (17.8 cm) long in the transverse direction. The average thickness of the film samples was determined and recorded and a strip chart recorder was calibrated at 0 gram and at 1,000 grams full scale load. Each film sample was then secured between two clamps spaced 10 cm apart. One clamp is in a fixed position and the other is connected to a strain gauge transducer. The secured film sample and strain gauge transducer were then immersed in a silicone oil bath maintained at a constant, elevated temperature for a period of five seconds. During this time, the force in grams at the elevated temperature was read from the strip chart and this reading was recorded. At the end of this time, the film sample was removed from the bath and allowed to cool to room temperature whereupon the force in grams at room temperature was also read from the strip chart and recorded. The shrink force for the film sample was then determined from the following equation wherein the result is obtained in grams per mil of film thickness (g/mil):

$$\text{Shrink Force (g/mil)} = \frac{F}{T}$$

wherein F is the force in grams and T is the average thickness of the film samples in mils.

Unless otherwise noted, the physical properties reported in the examples below were measured by either the test procedures described above or tests similar to the following methods.

Average Gauge: ASTM D-2103
Density: ASTM D-1505
Tensile Strength: ASTM D-882, Method A
Secant Modulus: ASTM D-882, Method A
Percent Elongation: ASTM D-882, Method A
Melt Index: ASTM D-1238, Condition E
Melt Flow Index: ASTM D-1238, Condition F
Melting Point: ASTM D-3418, DSC with 5° C/min. heating rate
Vicat Softening Point: ASTM D-1525, Rate A All ASTM test methods noted herein are incorporated by reference into this disclosure.

The following are examples and comparative examples given to illustrate the present invention.

In all the following examples, unless otherwise indicated herein the film compositions were produced generally utilizing the apparatus and method described in U.S. Pat. No. 3,456,044 (Pahlke) which describes an extrusion type of double bubble method and in further accordance with the detailed description above. In Examples 1-11 below, the extruded primary tube was wound on a reel and subsequently biaxially oriented following the Pahlke method. For Examples 1-11, an interval of about one day occurred between extrusion of the primary tube and biaxial orientation due to equipment availability. It is believed that this delay promoted crystallization in the primary tube thereby reducing shrinkage of the film. It is further contemplated that use of a process which is continuous from primary extrusion through biaxial orientation will provide increased shrink percentages for films which are otherwise similarly made. For Examples 12-19 the primary tube was continuously extruded and biaxially stretched. Those skilled in the art of manufacturing biaxially oriented films know of different and various processes for such manufacture and the present inventive films include biaxially oriented or stretched films regardless of the method used for their production. All percentages are by weight unless indicated otherwise.

The VLDPE material used in the following examples comprised: an ethylene and 1-octene VLDPE copolymer available from The Dow Chemical Company of Midland, Mich., under the brand designation Attane 4001; an ethylene and 1-butene VLDPE copolymer available from Union Carbide Corporation (hereinafter "UCC") of Danbury, Conn., under the brand designation UCAR DFDA 1137 Natural 7 and three different VLDPE copolymers of ethylene and 1-hexene available from UCC under the brand designations DEFD 1569, DEFD 1063, and DEFD 1064. These materials from the indicated suppliers have the reported or measured properties listed in Table A. The densities listed for Nos. 1–4 are reported values believed to have been determined by ASTM D-1505 whereas the reported density for No. 5 is believed to have been determined by ASTM-792. The melting points were determined by Differential Scanning Calorimetry utilizing a DuPont 9000 DSC calormeter and the procedure for first order transition with a 5° c per minute heating rate. The melting peak temperature Tm is reported as the melting point in ° C.

TABLE A

| # | VLDPE TYPE | DENSITY g/cc | MELT INDEX dg/min | DSC MELTING POINT °C. | VICAT SOFTENING TEMP. °C. |
| --- | --- | --- | --- | --- | --- |
| 1 | DFDA 1137 | 0.906 | 1.0 | 121 | 80 |
| 2 | DEFD 1063 | 0.905 | 0.5 | 124 | 93 |
| 3 | DEFD 1064 | 0.910 | 1.0 | 124 | 90 |
| 4 | DEFD 1569 | 0.910 | 1.0 | 124 | 94 |
| 5 | ATTANE 4001 | 0.912 | 1.0 | 123 | 78 |

EXAMPLES 1–5

In examples 1–5 a series of monolayer films were made from two different very low density polyethylene (VLDPE) resins and various blends of these two resins. Several physical properties of these films were measured and are presented in Table 1. Examples 1–2 are comparative (not of the invention), while examples 3–5 are films according to the present invention.

In comparative example 1 a VLDPE copolymer of ethylene and 1-butene (commercially available from Union Carbide Corporation (UCC) of Danbury, Conn., under the brand designation UCAR DFDA 1137 Natural 7) having a reported density of 0.905 g/cc and a melt index of 1.0 a melting point of 121° C. and a Vicat Softening temperature of about 80° C. was fed by hopper to a standard single screw extruder equipped with a standard fluted screw with a Maddox mixing section and a standard 2.178 inch (6.35 cm) diameter ring die. The resin was heat plastified and extruded into a primary tube. This primary tube was then biaxially stretched according to a double bubble process and the resultant biaxially stretched film wound on a reel.

In comparative example 2, a VLDPE copolymer of ethylene and 1-hexene (available as an experimental resin from UCC under the brand designation DEFD 1569) having a reported density of 0.910 g/cc, a melt index of 1.0, a melting point of 124° C., and a Vicat softening point of 94° C. was made into a biaxially oriented film by an extrusion type double bubble process as described for comparative example 1.

In examples 3–5, blends of the above described VLDPE resins of comparative examples 1 and 2 were also made by mixing resin pellets of the 1-butene copolymer with the 1-hexene copolymer in a tumbler type mixer followed by placement of the uniformly mixed resin pellets into an extruder hopper with subsequent processing as described above for comparative examples 1 and 2. The weight percentages and weight ratio of the blend components for examples 3–5 are reported in Table 1.

In all of the examples 1–5 the following process conditions were utilized. The extruder barrel and die temperatures ranged from about 340°–350° F. (171°–177° C.). The machine direction (M.D.) orientation ratio was from about 3.1:1 to 4.1:1 and the transverse direction (T.D.) orientation ratio was from 3.4:1 to 4.1:1. Draw point temperature, bubble cooling rates and orientation ratios were adjusted to maximize bubble stability.

The average gauge of each film was measured by a method similar to ASTM D-2103 and various other physical properties measured by tests described above. These test results are reported in Table 1.

TABLE 1

| | VLDPE BLEND COMPONENTS | | | | DYN. PUNC. (cmKg/ mil) | HOT WATER PUNC. (sec./gauge) | SHRINK at 90° C. % M.D./T.D. | SHRINK FORCE | |
| --- | --- | --- | --- | --- | --- | --- | --- | --- | --- |
| # | Ethylene/1-butene Copolymer* (A) Wt. % | Ethylene/1-hexene Copolymer** (B) Wt. % | A:B Wt. Ratio | AVG. GAUGE (mil) | | | | at 90° C. (gm/mil) M.D./T.D. | at RT (gm/mil) M.D./T.D. |
| 1 | 100 | 0 | — | 2.40 | 2.70 | 12.0/1.57 mil | 29/36 | 100/160 | 70/110 |
| 2 | 0 | 100 | — | 1.90 | 2.61 | 120+/1.51 mil | 17/22 | 110/145 | 70/130 |
| 3 | 25 | 75 | 1:3 | 1.50 | 3.03 | 120+/1.42 mil | 24/28 | 125/155 | 90/120 |
| 4 | 50 | 50 | 1:1 | 1.91 | 2.74 | 54.0/1.94 mil | 23/30 | 120/150 | 80/115 |
| 5 | 75 | 25 | 3:1 | 1.88 | 2.71 | 22.2/1.78 mil | 24/32 | 115/160 | 80/115 |

RT - Room Temperature
*Commercially available VLDPE copolymer of ethylene and 1-butene sold by Union Carbide Corporation of Danbury, Connecticut under the brand designation DFDA 1137, Natural 7 and having a reported density of 0.906 g/cc and 1.0 melt index.
**Experimental VLDPE copolymer of ethylene and 1-hexene sold by Union Carbide Corporation of Danbury, Connecticut under the brand designation DEFD 1569 and having a reported density of 0.910 g/cc and 1.0 melt index.

Referring to Table 1, the dynamic puncture resistance test was performed on sixteen samples for each example and the averaged results reported.

Puncture resistance is a useful property of packaging films in general and an important property of food packaging films. Puncture resistance is very important for films used in forming bags for poultry. These poultry bags must have a high puncture resistance in order to withstand packaging operations and transport as well as retail customer inspection and handling. Punctured poultry bags not only expose the contained birds to spoilage agents, but also allows leakage of liquid from within the bag. This leakage is highly undesirable to grocery shoppers and retailers. In retail poultry displays leaked liquid often is transferred to adjacent products making displays and selection messy. A shopper who places a punctured bag into a grocery cart may cause moisture damage to paper products or packaging. In addition, concern about possible salmonella contamination via contact with leaked poultry liquid increases the desirability of puncture resistant poultry packaging.

Surprisingly, the dynamic puncture resistance is significantly improved for the inventive blend of example 3, having 1-butene VLDPE (A) blended with 1-hexene VLDPE (B) in a 1:3 weight ratio relative to similarly produced films of A or B alone (comparative examples 1–2). This higher puncture resistance for the blend would not be expected or predicted from the results of comparative examples 1-2. Also, examples 4 and 5 of the invention show puncture resistance which is at least as good as the resistance shown by comparative examples 1 or 2.

Hot water puncture resistance measures puncture resistance at elevated temperature. Use of shrinkable films to package goods including red meat or poultry typically entails passage of the packaged goods through a shrink tunnel or other means to apply elevated temperatures to the film to induce shrinkage. Protuberances such as sharp bones or wing tips of birds may cause punctures during typical shrink procedures of packaging operations. The hot water puncture resistance test measures the resistance to puncture under conditions of elevated temperature. Typical shrink procedures expose products such as poultry or red meat to elevated temperatures for up to 6-8 seconds. Therefore, a minimum of 15 seconds resistance to puncture is desired at elevated temperature to provide a margin of safety to avoid the costs associated with defective packaging. Preferably, films suitable for packaging poultry will have an average hot water puncture value of at least about 20 seconds. As seen from the results in Table 1, examples 3-5 of the present invention and comparative example 2 meet or exceed the preferred time of puncture resistance at elevated temperature.

Shrinkable poultry bags need to have sufficient shrinkage to conform the film to the irregular shape of a bird during and after packaging. Each film's unrestrained shrinkage at 90° C. for 5 seconds was measured in both M.D. and T.D. directions and reported as a percentage of the original dimensions. An average shrinkage percent for four samples is reported. Examples 3-5 of the present invention all show good shrinkage values with over 20% shrinkage in the machine direction and over 25% shrinkage in the transverse direction.

Also, shrink force was measured at 90° C. to determine a film's ability to pull the wings of a processed bird in close to the body of the bird. The required force to do this is particularly high for turkeys. The residual force was also measured at room temperature after the film cooled. This residual force is very important to ensure a long lasting tight package. Relaxation of the film produces a poorer product appearance, increases the storage space requirements for packaged birds and also increases the likelihood that the packaging film may be torn or otherwise damaged.

either of the unblended films alone (comparative examples 1-2) at 90° C. Also, a film having a 1:3 weight ratio blend of the 1-butene VLDPE to the 1-hexene VLDPE has a significantly and unexpectedly higher residual shrink force in the machine direction.

EXAMPLES 6-9

In examples 6-9, a series of monolayer films were made according to the process described above with respect to examples 1-5. Physical properties were measured as with examples 1-5 and the results reported in Table 2. Examples 6-8 are of the invention. Example 9 is a comparative example (not of the invention) of a VLDPE film comprising a copolymer of ethylene and 1-octene (commercially available from The Dow Chemical Company of Midland, Mich., under the brand designation Attane 4001) having a reported density of 0.912 g/cc, a 1.0 melt index, a melting point of about 123° C. and a Vicat softening point of about 78° C.

Reported test values in Table 2 are not directly comparable to those of Table 1 since orientation conditions varied slightly. In particular, for examples 6-9 the machine direction (M.D.) orientation ratio was from 3.8:1 to 3.9:1 and the transverse direction (T.D.) orientation ratio was from 3.8:1 to 4.1:1.

Referring to Table 2, all films made from blends according to the present invention (examples 6-8) are shown to have good dynamic puncture and hot water puncture resistance. Example 9 is a comparative example of a VLDPE copolymer of ethylene and 1-octene. Octene monomer is generally more expensive than butene or hexene monomer and very low density polyethylene made from octene monomer generally has better puncture resistance properties than 1-butene based VLDPE. In contrast, butene based VLDPE has generally greater shrinkage values than octene based VLDPE. As seen from Table 2, the inventive blends are equal or superior to 1-octene based VLDPE in shrinkage values and shrink force and also have acceptable hot water puncture times and good dynamic puncture values. In particular, examples 7 and 8 show exceptionally good shrink force values at both 90° C. and residually at room temperature. Table 2 demonstrates that blends of the present invention provide films having physical properties which are comparable to VLDPE made from a generally higher priced mononer/1-octene.

TABLE 2

| # | VLDPE BLEND COMPONENTS | | | A:B Wt. Ratio | AVG. GAUGE (mil) | DYN. PUNC. (cmKg/mil) | HOT WATER PUNC. (sec./gauge) | SHRINK at 90° C. % M.D./T.D. | SHRINK FORCE | |
|---|---|---|---|---|---|---|---|---|---|---|
| | Ethylene/ 1-butene Copolymer* (A) Wt. % | Ethylene/ 1-hexene Copolymer** (B) Wt. % | OTHER VLDPE *** Wt. % | | | | | | at 90° C. (gm/mil) M.D./T.D. | at RT (gm/mil) M.D./T.D. |
| 6 | 15 | 85 | — | 3:17 | 1.61 | 2.5 | 120+/2.23 mil | 18/23 | 95/150 | 70/115 |
| 7 | 25 | 75 | — | 1:3 | 1.47 | 2.7 | 57.6/1.44 mil | 20/25 | 115/150 | 85/110 |
| 8 | 35 | 65 | — | 7:13 | 1.50 | 2.7 | 48.6/1.71 mil | 20/26 | 110/160 | 80/115 |
| 9 | — | — | 100 | — | 1.56 | 3.1 | 120+/2.22 mil | 16/22 | 100/135 | 70/100 |

RT - Room Temperature
*Commercially available VLDPE copolymer of ethylene and 1-butene sold by Union Carbide Corporation of Danbury, Connecticut under the brand designation DFDA 1137, Natural 7 and having a reported density of 0.906 g/cc and 1.0 melt index.
**Experimental VLDPE copolymer of ethylene and 1-hexene sold by Union Carbide Corporation of Danbury, Connecticut under the brand designation DEFD 1569 and having a reported density of 0.910 g/cc and 1.0 melt index.
***Commercially available VLDPE copolymer of ethylene and 1-octene sold by The Dow Chemical Company of Midland, Michigan under the brand designation Attane 4001 and having a reported density of 0.912 g/cc and 1.0 melt index.

The inventive films of examples 3-5 all showed good shrink force at initial shrinking temperatures (90° C.) and good residual force at room temperature. Surprisingly, the machine direction forces were greater for the blended films of the invention (examples 3-5), than for

EXAMPLES 10-11

In Examples 10 and 11 two multilayer films were coextruded and biaxially oriented according to a coextrusion type of double bubble process such as that described in U.S. Pat. No. 3,456,044 (Pahlke). This process was similar to that described above for examples 1-5 except that one extruder was used for each layer and the heat plastified resins from each extruder were introduced to a coextrusion die from which resins were coextruded in an inner:core:outer layer ratio of about 4:1:2. The coextruded film was oriented as for examples 1-5 except as noted below. The extruder barrel temperatures for the core layer ranged from 260° to 270° F. (127°-132° C.) and for the outer layers ranged from about 340° to 350° F. (171°-177° C.). The coextrusion die temperature profile was set at about 275° to about resins. It is contemplated that additional resins may be added to the VLDPE blend of the present invention in amounts of up to 50 weight percent or more. Indeed it is believed that minor amounts (less than 50 weight percent) or small amounts (less than 10 weight percent) of the disclosed VLDPE blends may be usefully employed to modify or blend with other resins such as LLDPE, VLDPE, LDPE, EVA or polypropylene.

Referring to Table 3, it is seen that the inventive biaxially oriented multilayer film has good puncture resistance and shrinkage and the shrink force compares favorably with the 1-octene film of comparative example 11.

TABLE 3

| # | VLDPE BLEND COMPONENTS | | | AVG. GAUGE (mil) | DYN. PUNC. (cmKg/ mil) | HOT WATER PUNC. (sec./gauge) | SHRINK at 90° C. % M.D./T.D. | SHRINK FORCE at 90° C. (gm/mil) M.D./T.D. | SHRINK FORCE at RT (gm/mil) M.D./T.D. |
|---|---|---|---|---|---|---|---|---|---|
| | Inner Layer | Core Layer | Outer Layer | | | | | | |
| 10 | 1-butene/ 1-hexene VLDPE BLEND* | vinylidene chloride copolymer blend+ | LLDPE | 1.97 | 2.78 | 45.6/2.03++ | 12/20 | 65/115 | 50/95 |
| 11 | 1-octene VLDPE** | vinylidene chloride copolymer blend+ | LLDPE | 1.51 | 3.04 | 22.8/1.40 | 13/22 | 45/105 | 60/85 |

RT - Room Temperature
*A blend of (A) and experimental VLDEP copolymer of ethylene and 1-hexene sold by Union Carbide Corp. of Danbury, Connecticut under the brand designation DEFD 1569 with (b) a commercially available (1-hexene/ethylene copolymer) with DFDA 1137 (1-butene/ethylene copolymer). This blend was further blended with 15% by weight of an ethylene-vinyl acetate copolymer (EVA).
**VLDPE copolymer of ethylene and 1-butene sold by Union Carbide Corp. of Danbury, Connecticut under the brand designation DFDA 1137. A and B are blended in an A:B ratio of 3:1. A commercially available VLDPE copolymer of ethylene and 1-octene sold by The Dow Chemical Company under the brand name Attane 4001. This VLDPE was blended with 15% by weight of an ethylene-vinyl acetate copolymer (EVA).
+A 3:1 blend of a commercially available vinylidene chloride-methylacrylate copolymer and vinylidene chloride-vinyl chloride copolymer.
++Average for four of six samples. The two other samples were >120/2.05.

310° F. (135°-154° C.) in examples 10 and 11. The M.D. orientation ratio was 3.8:1 to 4.0:1 and the T.D. orientation ratio was 4.5:1 to 4.7:1 for both films. The average gauge and other physical properties were measured and are reported in Table 3. For both examples 10 and 11, the core layer comprised a 3:1 blend of commercially available vinylidene chloride-methylacrylate copolymer and vinylidene chloride-vinyl chloride copolymer and the outer layer comprised a linear low density polyethylene (LLDPE). The core layer and outer layer resins were identical for both examples 10 and 11.

Example 10 is of the invention and comprised an inner layer having 85 weight percent of a 1:3 weight ratio blend of 1-butene VLDPE and 1-hexene VLDPE and 15 weight percent of a commercially available pellet form copolymer of ethylene and vinyl acetate (EVA). The VLDPEs used were the same resins described above for examples 1-5.

Example 11 is a comparative example (not of the invention). The coextruded multilayer film of example 11 was similar in composition to example 10 except that the inner layer was comprised of a blend of 85 weight percent of a 1-octene VLDPE and 15 weight percent EVA. The 1-octene VLDPE and EVA resins were the same as those used for examples 9 and 10 above.

Example 10 demonstrates that a coextruded multilayer film having a novel blend of 1-butene VLDPE and 1-hexene VLDPE may be made having useful properties. Furthermore, example 10 shows that the novel VLDPE blends may be further blended with additional

EXAMPLES 12-13

In Examples 12-13 two monolayer films were made utilizing two different hexene based VLDPE resins blended with the same butene based VLDPE resin. Several physical properties of these films were measured and are presented in Tables 4A and 4B.

Reported test values in Tables 4A-4B are not directly comparable to those of Tables 1-3 since process parameters varied. In these examples, a VLDPE copolymer of ethylene and 1-butene designated UCAR DFDA 1137 Natural 7 was used. This is the same VLDPE butene based resin previously described in the earlier examples. This resin was blended with two different hexene based VLDPE resins, DEFD 1063 and DEFD 1064 (both available from Union Carbide Corporation) and processed into biaxially stretched films by the previously described method for Examples 1-5 except that the primary tube was continuously extruded and biaxially stretched and certain process parameters varied. In particular, the M.D./T.D. orientation ratios for Examples 12 and 13 were 3.8:1 and 3.7:1 respectively. The reported test results in Tables 4A and 4B indicate that both blends had good film properties including 1% secant modulus, elongation at break, tensile strength, and dynamic puncture resistance. The hot water puncture resistance for Example 12 was superior to that for Example 13 while Example 13 had better shrinkage values.

TABLE 4A

| # | VLDPE BLEND COMPONENTS Ethylene/1-butene Copolymer* (A) Wt. % | Ethylene/1-hexene Copolymer** (B) Wt. % TYPE I | Ethylene/1-hexene Copolymer** (B) Wt. % TYPE II | A:B Wt. Ratio | AVG. GAUGE (mil) | DYN. PUNC. (cmKg/mil) | HOT WATER PUNC. (sec./gauge) | SHRINK at 90° C. % M.D./T.D. | SHRINK FORCE at 90° C. (gm/mil) M.D./T.D. | SHRINK FORCE at RT (gm/mil) M.D./T.D. |
|---|---|---|---|---|---|---|---|---|---|---|
| 12 | 25 | 75 | — | 1:3 | 2.32 | 2.3 | 82.2/2.34 | 18/26 | 115/180 | 75/130 |
| 13 | 25 | — | 75 | 1:3 | 2.26 | 2.2 | 28.8/1.96 | 19/28 | 140/190 | 90/140 |

RT - Room Temperature
*Commercially available VLDPE copolymer of ethylene and 1-butene sold by Union Carbide Corporation of Danbury, Connecticut under the brand designation DFDA 1137, Natural 7 and having a reported density of 0.906 g/cc and 1.0 melt index.
**Experimental VLDPE copolymers of ethylene and 1-hexene available from Union Carbide Corporation of Danbury, Connecticut under the brand designation DEFD 1063 and DEFD 1064. DEFD 1063 is designated in the Table as Type I and DEFD 1064 is designated at Type II. DEFD 1063 has a reported density of 0.905 g/cc and 1.0 melt index. DEFD 1064 has a reported density of 0.910 g/cc and a 1.0 melt index.

TABLE 4B

| # | VLDPE BLEND COMPONENTS Ethylene/1-butene Copolymer* (A) Wt. % | Ethylene/1-hexene Copolymer** (B) Wt. % TYPE I | Ethylene/1-hexene Copolymer** (B) Wt. % TYPE II | A:B Wt. Ratio | 1% Secant Modulus at RT × $10^3$ M.D./T.D. | Elongation at Break at RT M.D./T.D. | Tensile Strength at RT kPa × $10^3$ M.D./T.D. | Tensile Strength at RT psi × $10^3$ M.D./T.D. |
|---|---|---|---|---|---|---|---|---|
| 12 | 25 | 75 | — | 1:3 | 25.8/22.9 | 255/230 | 66/63 | 9.5/9.2 |
| 13 | 25 | — | 75 | 1:3 | 22.5/22.1 | 255/235 | 60/61 | 8.7/8.9 |

*Commercially available VLDPE copolymer of ethylene and 1-butene sold by Union Carbide Corporation of Danbury, Connecticut under the brand designation DFDA 1137, Natural 7 and having a reported density of 0.906 g/cc and 1.0 melt index.
**Experimental VLDPE copolymers of ethylene and 1-hexene available from Union Carbide Corporation of Danbury, Connecticut under the brand designation DEFD 1063 and DEFD 1064 and having a reported density of 0.905 g/cc and 1.0 melt index. DEFD 1063 is designated in the Table as Type I and DEFD 1064 is designated as Type II.
RT = Room Temperature

EXAMPLES 14-18

In Examples 14-18, a comparison of properties of different biaxially stretched films was conducted. Example 14 is a comparative example (not of the invention) of a film made from 98 wt % of UCAR DFDA 1137 (the $C_2C_4$ VLDPE used in earlier examples). Two weight percent of a slip agent (Ampacet LD 4002) was added to prevent lamination of the primary tube during extrusion. Example 18 is also a comparative example (not of the invention) of a film made from UCC ethylene-hexene-1 VLDPE copolymer designated DEFD 1064. Examples 15-17 are films made from the blends of these two VLDPE resins in the varying proportions indicated in Table 5. All films were made using the double bubble process as described above for Examples 12-13 with extrusion temperatures being between about 170°-180° C. In each of the Examples 14-18 the primary tube was similarly extruded to produce a tube having a three inch flat width and thickness of 32-36 mil. Orientation conditions were held as constant as possible with the M.D. orientation ratio set at about 4.12:1-4.14:1 and the T.D. orientation ratio set at about 3.75:1-3.79:1. Puncture and shrink related properties were measured and reported in Table 5. Comparative Example 14 had an undesirably low hot water puncture time. The best reported dynamic puncture was for Example 17. The film having the best overall properties was the 1:3 blend of Example 16 which exhibited good shrinkage value, puncture resistance, hot water puncture resistance and surprisingly good M.D. shrink force both at elevated temperature and residually at room temperature. The results of Table 5 demonstrate that biaxially stretched films made from blends of the VLDPE resin may produce unexpectedly good film properties and combinations of properties relative to similarly made films of either blend component alone.

TABLE 5

| # | VLDPE BLEND COMPONENTS Ethylene/1-butene Copolymer* (A) Wt. % | Ethylene/1-hexene Copolymer** (B) Wt. % | A:B Wt. Ratio | AVG. GAUGE (mil) | DYN. PUNC. (cmKg/mil) | HOT WATER PUNC. (sec./gauge) | SHRINK at 90° C. % M.D./T.D. | SHRINK FORCE at 90° C. (gm/mil) M.D./T.D. | SHRINK FORCE at RT (gm/mil) M.D./T.D. |
|---|---|---|---|---|---|---|---|---|---|
| 14 | 98 | 0 | — | 2.08 | 2.3 | 7.7/2.16 mil | 26/34 | 130/210 | 75/135 |
| 15 | 50 | 50 | 1:1 | 2.22 | 2.3 | 58/2.24 mil | 14/22 | 65/145 | 50/100 |
| 16 | 25 | 75 | 1:3 | 2.38 | 2.2 | 44/2.43 mil | 17/25 | 100/180 | 70/125 |
| 17 | 10 | 90 | 1:9 | 2.14 | 2.6 | 120+/2.20 mil | 11/19 | 75/165 | 55/125 |
| 18 | 0 | 100 | — | 2.09 | 2.3 | 120+/2.28 mil | 12/20 | 85/150 | 55/120 |

RT - Room Temperature
*Commercially available VLDPE copolymer of ethylene and 1-butene sold by Union Carbide Corporation of Danbury, Connecticut under the brand designation DFDA 1137, Natural 7 and having a reported density of 0.906 g/cc and 1.0 melt index. In Example 14 resin A was blended with 2% Ampacet LD 4002 as a slip agent to prevent lamination of the primary tube.
**Experimental VLDPE copolymer of ethylene and 1-hexene sold by Union Carbide Corporation of Danbury, Connecticut under the brand designation DEFD 1064 abnd having a reported density of 0.910 g/cc and 1.0 melt index.

EXAMPLE 19

In Example 19 a preferred film of the present invention was made using a blend of 63.2 wt % of a 3:1 wt % blend of a $C_2 C_6$ VLDPE (DEFD 1064) and $C_2C_4$ VLDPE (DFDA 1137), with 32.9 wt % of ethylene-vinyl acetate copolymer (sold by Union Carbide under the trade designation UCC 6833) and 3.9 wt % of a processing aid. All resins were FDA approved for food contact. The resins were melt plastified in an extruding barrel set at a temperature of about 177° C. The melt temperature exiting die was about 185° C. A primary monolayer tube was extruded and oriented according to the double-bubble method at an orientation temperature believed to be about 100° C. The M.D. orientation ratio was about 5.17:1 and the T.D. orientation ratio was about 2.60:1. The film biaxially stretched film was analyzed and found to have an M.D./T.D. shrinkage value of 31/33 percent at 90° C., a M.D./T.D. shrink force at elevated temperatures of 6.0/102 g/mil and residually at room temperature of 07/87 g/mil, a dynamic puncture of 1.97 cm kg/mil, a hot water puncture time of 120+ seconds at 2.2 mil, an M.D./T.D. tensile strength of 11,100/5,800 p.s.i., an M.D./T.D. elongation at break of 176/387 percent, and an M.D./T.D. 1% secant modulus of 21,400/22,700 p.s.i. The foregoing properties demonstrate that the above film has a particularly useful combination of commercially desirable and advantageous properties.

Further modifications of the invention disclosed will be apparent to those skilled in the art and all such modifications are deemed to be within the scope of the invention as defined by the following claims.

What is claimed is:

1. A biaxially stretched flexible film comprising a blend of (a) a VLDPE copolymer of ethylene and 1-butene having a density less than 0.915 g/cc, and a Vicat softening point of at least 70° C., a melting point greater than 100° C., and (b) a VLDPE copolymer of ethylene and 1-hexene having a density less than 0.915 g/cc, a Vicat softening point of at least 70° C. and a melting point greater than 100° C.

2. A biaxially stretched flexible film, as defined in claim 1, wherein said components (a) and (b) are present in said blend in an a:b weight ratio of from 1:7 to 3:1.

3. A biaxially stretched flexible film, as defined in claim 1, wherein said components (a) and (b) are present in said blend in an a:b weight ratio of from 1:4 to 3:1.

4. A biaxially stretched flexible film, as defined in claim 1, wherein said ratio of component (a) to component (b) is from 1:4 to 1:2.

5. A biaxially stretched flexible film, as defined in claim 1, wherein said ratio of component (a) to component (b) is about 1:3.

6. A biaxially stretched flexible film, as defined in claim 1, wherein component (a) is present in an amount of from about 20 to about 75 weight percent and component (b) is present in an amount from about 25 to about 80 weight percent.

7. A biaxially stretched flexible film, as defined in claim 1, wherein component (a) is present in an amount of about 25 weight percent and component (b) is present in an amount of 75 weight percent.

8. A biaxially stretched flexible film, as defined in claim 1, wherein said film has at least about 15% shrinkage in the machine direction and at least about 20% shrinkage in the transverse direction.

9. A biaxially stretched flexible film, as defined in claim 1, wherein said film has a residual shrink force in the machine direction that is greater than that for a similar film comprising component (a) without component (b) or component (b) without component (a).

10. A biaxially stretched flexible film, as defined in claim 1, wherein said film has a puncture resistance which is greater than the puncture resistance for similar films made from components (a) without component (b) or component (b) without component (a).

11. A biaxially stretched flexible film, as defined in claim 1, wherein said blend further comprises ethylene-vinyl acetate copolymer.

12. A biaxially stretched flexible film, as defined in claim 11, wherein at least 50 wt % of said film comprises VLDPE polymers.

13. A biaxially stretched flexible film, as defined in claim 1, further comprising at least one additional coextruded layer.

14. A biaxially stretched flexible film, as defined in claim 5, wherein said film has a puncture resistance which is greater than the puncture resistance for unblended films comprising either component (a) or component (b).

15. A biaxially stretched flexible film, as defined in claim 4, wherein said film has a residual shrink force in the machine direction that is greater than that for an unblended film of component (a) or (b) alone.

16. A biaxially stretched flexible film, as defined in claim 5, further comprising between about 20-40 wt % of ethylene-vinyl acetate copolymer.

17. A biaxially stretched flexible film, as defined in claim 4, wherein said film has at least about 20% shrinkage in the machine direction, at least about 25% shrinkage in the transverse direction, a puncture resistance greater than the unblended film of component (a) or (b), and a residual shrink force in the machine direction greater than that for unblended films of component (a) or (b).

18. A biaxially stretched flexible film, as defined in claim 13, wherein said at least one additional coextruded layer is biaxially oriented.

19. A biaxially stretched flexible film, as defined in claim 13, wherein said at least one additional coextruded layer comprises an oxygen barrier intermediate layer and an outer layer of linear low density polyethylene.

20. A biaxially stretched multilayer film comprising: an inner layer of a blend of (a) a VLDPE copolymer of ethylene and 1-butene having a density between 0.860 and 0.915 g/cc and (b) a VLDPE copolymer of ethylene and 1-hexene having a density between about 0.860 and 0.915 g/cc, wherein said inner layer blend is in a weight percent ratio of (a) to (b) of from 1:7 to 3:1; an outer layer of VLDPE, LLDPE, LDPE, HDPE or blends thereof; and an intermediate oxygen barrier layer.

* * * * *